(12) United States Patent
Goto et al.

(10) Patent No.: US 8,591,018 B2
(45) Date of Patent: Nov. 26, 2013

(54) INK SET AND INK-JET RECORDING METHOD

(75) Inventors: Kazuma Goto, Nagoya (JP); Akihiko Taniguchi, Kakamigahara (JP); Shunichi Higashiyama, Yokkaichi (JP); Masashi Tsuda, Ichinomiya (JP); Hiromitsu Sago, Tokai (JP); Narumi Koga, Nagoya (JP); Michiko Aoyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 174 days.

(21) Appl. No.: 13/075,576

(22) Filed: Mar. 30, 2011

(65) Prior Publication Data
US 2011/0292117 A1 Dec. 1, 2011

(30) Foreign Application Priority Data
May 31, 2010 (JP) .................. 2010-124458

(51) Int. Cl.
*B41J 2/01* (2006.01)

(52) U.S. Cl.
USPC .................. 347/96; 347/95; 347/98; 347/100

(58) Field of Classification Search
USPC ................ 347/95–100, 21, 28; 523/160, 161; 106/31.13, 31.27, 31.6
See application file for complete search history.

(56) References Cited

U.S. PATENT DOCUMENTS

| | | | |
|---|---|---|---|
| 4,890,126 A | 12/1989 | Hotomi | |
| 5,609,671 A | 3/1997 | Nagasawa | |
| 5,837,045 A | 11/1998 | Johnson et al. | |
| 6,084,619 A | 7/2000 | Takemoto et al. | |
| 6,261,349 B1 | 7/2001 | Nagai et al. | |
| 6,261,353 B1 | 7/2001 | Doi et al. | |
| 6,270,212 B1 | 8/2001 | Kusumi et al. | |
| 6,286,953 B1 | 9/2001 | Takemoto et al. | |
| 6,536,890 B1 | 3/2003 | Kato et al. | |
| 6,540,314 B1 | 4/2003 | Sanada et al. | |

(Continued)

FOREIGN PATENT DOCUMENTS

| | | |
|---|---|---|
| JP | 08-003498 | 1/1996 |
| JP | 08-020720 | 1/1996 |

(Continued)

OTHER PUBLICATIONS

EP Extended Search Report dated Oct. 7, 2011, corresponding Application No. 11160737.0.

(Continued)

*Primary Examiner* — Matthew Luu
*Assistant Examiner* — Rut Patel
(74) *Attorney, Agent, or Firm* — Banner & Witcoff, Ltd.

(57) ABSTRACT

An ink set containing a water-based ink for ink jet recording and a treatment liquid. The water-based ink contains a phosphate-group modified self-dispersing pigment, water, and a water-soluble organic solvent. The treatment liquid contains an aggregating agent, water, and a water-soluble organic solvent. A dynamic surface tension of the water-based ink, measured under the condition where a life time is about 50 ms, is in the range of 35 mN/m to 45 mN/m. A dynamic surface tension of the treatment liquid, measured under the condition where a life time is about 50 ms, is in the range of 33 mN/m to 45 mN/m.

6 Claims, 2 Drawing Sheets

(56) References Cited

U.S. PATENT DOCUMENTS

| | | | |
|---|---|---|---|
| 6,637,859 | B2 | 10/2003 | Williamson et al. |
| 6,863,391 | B2 | 3/2005 | Tomioka et al. |
| 7,040,747 | B2 | 5/2006 | Kubota et al. |
| 7,621,630 | B2 | 11/2009 | Ito et al. |
| 2001/0035897 | A1 | 11/2001 | Hayashi et al. |
| 2002/0044185 | A1 | 4/2002 | Koitabashi et al. |
| 2002/0044187 | A1 | 4/2002 | Koitabashi et al. |
| 2002/0077386 | A1 | 6/2002 | Kurabayashi et al. |
| 2004/0244645 | A1 | 12/2004 | Doi et al. |
| 2005/0012798 | A1 | 1/2005 | Adachi et al. |
| 2006/0023042 | A1 | 2/2006 | Doi |
| 2006/0098068 | A1 | 5/2006 | Hakamada et al. |
| 2006/0197814 | A1 | 9/2006 | Doi |
| 2006/0238589 | A1* | 10/2006 | Koga et al. .............. 347/100 |
| 2006/0238590 | A1* | 10/2006 | Koga et al. .............. 347/100 |
| 2006/0293410 | A1 | 12/2006 | Tokita et al. |
| 2007/0022902 | A1* | 2/2007 | Koga .................. 106/31.27 |
| 2007/0054981 | A1 | 3/2007 | Yanagi et al. |
| 2007/0100023 | A1* | 5/2007 | Burns et al. .............. 523/160 |
| 2007/0100024 | A1 | 5/2007 | Gu et al. |
| 2007/0176995 | A1 | 8/2007 | Kadomatsu et al. |
| 2007/0186812 | A1* | 8/2007 | Koga et al. .............. 106/31.58 |
| 2007/0247504 | A1 | 10/2007 | Koganehira et al. |
| 2007/0252881 | A1* | 11/2007 | Sanada et al. .............. 347/100 |
| 2008/0012887 | A1 | 1/2008 | Maeno et al. |
| 2008/0239036 | A1 | 10/2008 | Hattori |
| 2008/0241398 | A1 | 10/2008 | Kato et al. |
| 2008/0246820 | A1 | 10/2008 | Silverbrook |
| 2009/0229489 | A1 | 9/2009 | Gu |
| 2009/0234067 | A1 | 9/2009 | Kariya |
| 2009/0237442 | A1 | 9/2009 | Yamanobe |
| 2009/0304927 | A1 | 12/2009 | Kamibayashi et al. |
| 2010/0040782 | A1 | 2/2010 | Arai et al. |
| 2011/0227996 | A1 | 9/2011 | Ikoshi |
| 2012/0092413 | A1 | 4/2012 | Kawamura |

FOREIGN PATENT DOCUMENTS

| | | |
|---|---|---|
| JP | 08-174997 | 7/1996 |
| JP | 08-193175 | 7/1996 |
| JP | 09-207424 | 8/1997 |
| JP | 10-129114 | 5/1998 |
| JP | 10-250216 | 9/1998 |
| JP | 11-115303 | 4/1999 |
| JP | 11-343435 | 12/1999 |
| JP | 2000-198222 | 7/2000 |
| JP | 2000-513396 | 10/2000 |
| JP | 2001-162817 | 6/2001 |
| JP | 2001-353861 | 12/2001 |
| JP | 2002-079740 | 3/2002 |
| JP | 2002-086707 | 3/2002 |
| JP | 2002-103783 | 4/2002 |
| JP | 2002-201385 | 7/2002 |
| JP | 2004-359841 | 12/2004 |
| JP | 2006-241279 | 9/2006 |
| JP | 2007-179136 | 7/2007 |
| JP | 2007-230232 | 9/2007 |
| JP | 2007-261203 | 10/2007 |
| JP | 2008-213388 | 9/2008 |
| JP | 2008-230161 | 10/2008 |
| JP | 2008-246821 | 10/2008 |
| JP | 2009-515007 | 4/2009 |
| JP | 2009-220527 | 10/2009 |
| JP | 2009-297924 | 12/2009 |
| WO | 2007/053563 A2 | 5/2007 |

OTHER PUBLICATIONS

EP Extended Search Report dated Oct. 7, 2011 corresponding Application No. 11160739.6.

* cited by examiner

INK SET AND INK-JET RECORDING METHOD

CROSS-REFERENCE TO RELATED APPLICATION

This application claims priority from Japanese Patent Application No. 2010-124458 filed on May 31, 2010. The entire subject matter of the Japanese Patent Application is incorporated herein by reference.

BACKGROUND

There is a case that ink jet recording is performed using a treatment liquid containing an aggregating agent in order to increase an optical density (an OD value) of a recorded object. The aggregating agent contained in the treatment liquid can cause a self-dispersing pigment in a water-based ink to aggregate, resulting in increasing an optical density (an OD value) of the recorded object.

However, in ink jet recording using a conventional treatment liquid, ooze in a recorded image is not suppressed sufficiently.

SUMMARY

An ink set comprises: a water-based ink for ink jet recording; and a treatment liquid. The water-based ink comprises a self-dispersing pigment obtained by modifying a pigment by a phosphate group (hereinafter, also referred to as "phosphate group-modified self-dispersing pigment"), water, and a water-soluble organic solvent. The treatment liquid comprises an aggregating agent, water, and a water-soluble organic solvent. A dynamic surface tension of the water-based ink, measured under the condition where a life time is 50 ms, is in the range of 35 mN/m to 45 mN/m. A dynamic surface tension of the treatment liquid, measured under the condition where a life time is 50 ms, is in the range of 33 mN/m to 45 mN/m.

An ink jet recording method comprises: a treatment step of applying a treatment liquid to a recording medium, and a recording step of performing recording by ejecting a water-based ink on the recording medium using an ink jet system. As the water-based ink, the water-based ink in the above-mentioned ink set is used, and as the treatment liquid, the treatment liquid in the above-mentioned ink set is used.

DETAILED DESCRIPTION

Figure 1:
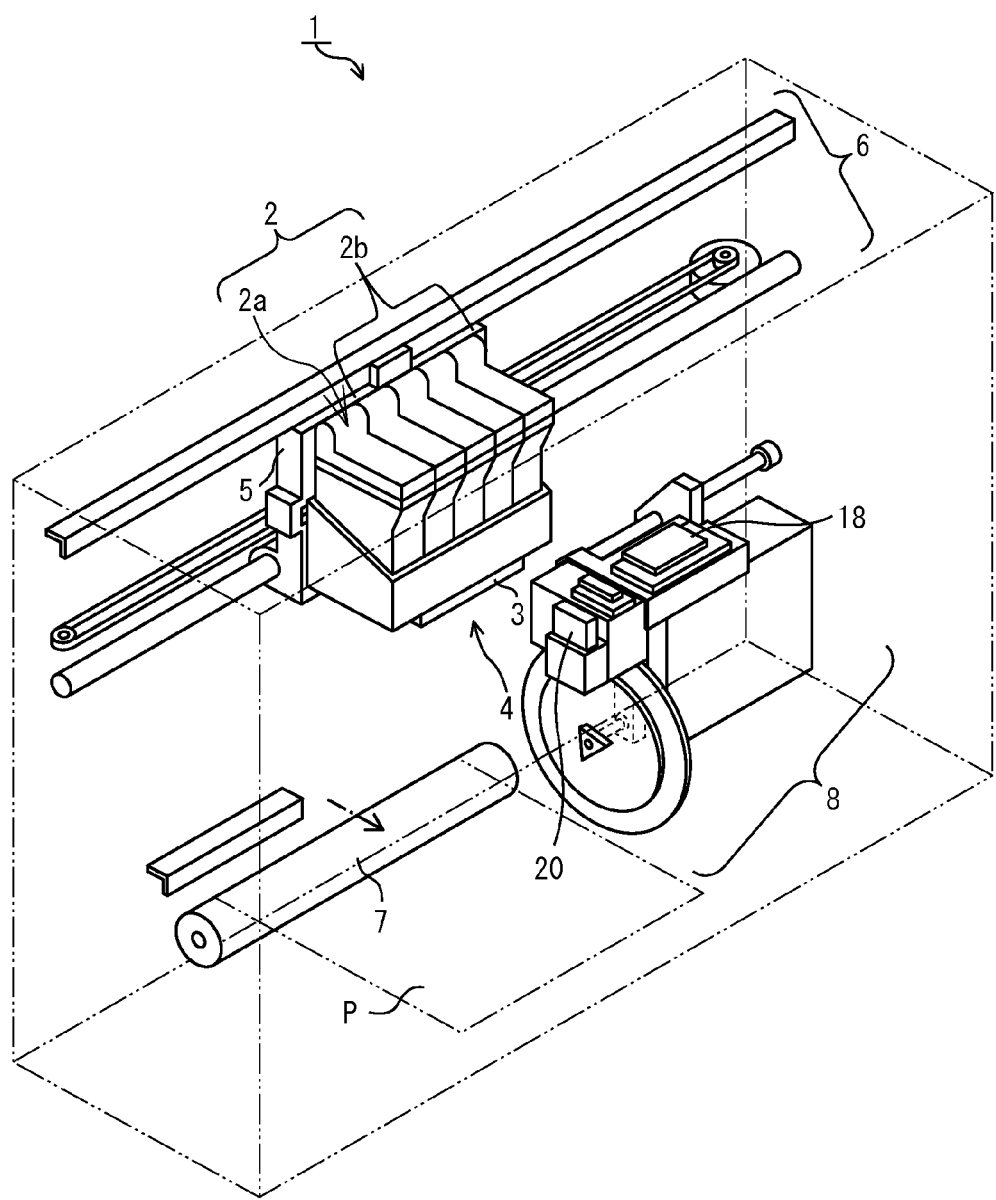
FIG. 1 is a schematic perspective view showing an example of a configuration of the ink jet recording apparatus.

As mentioned above, the ink set comprises a water-based ink for ink jet recording (hereinafter also merely referred to as "water-based ink" or "ink") and a treatment liquid.

The water-based ink comprises a phosphate group-modified self-dispersing pigment, water, and a water-soluble organic solvent. The phosphate group-modified self-dispersing pigment functions as a coloring agent, for example. The phosphate group-modified self-dispersing pigment may be prepared by treating a pigment described below by a method described in JP 2009-515007 A, for example. As the phosphate group-modified self-dispersing pigment, a commercially available product may be used. The water-based ink may or may not contain a polymer pigment dispersant. In the case where the water-based ink contains a polymer pigment dispersant, the amount of the polymer pigment dispersant to be contained may be an amount by which a viscosity of the water-based ink is not influenced. Since the water-based ink contains a self-dispersing pigment as mentioned above, the water-based ink does not have a problem in viscosity increase caused by a polymer pigment dispersant and may be superior in ejection stability and storing stability.

Examples of a pigment that may be used as a raw material of the phosphate group-modified self-dispersing pigment include carbon black, an inorganic pigment, and an organic pigment. Examples of the carbon black include furnace black, lamp black, acetylene black, and channel black. Examples of the inorganic pigment include inorganic pigments of titanium oxide, iron oxide, and carbon black. Examples of the organic pigment include: azo pigments such as azo lake, an insoluble azo pigment, a condensed azo pigment, and a chelate azo pigment; polycyclic pigments such as a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment; dye lake pigments such as a basic dye lake pigment and an acidic dye lake pigment; a nitro pigment; a nitroso pigment; and an aniline black daylight fluorescent pigment. Examples of the pigment other than these pigments include: C.I. Pigment Black 1, 6, and 7; C.I. Pigment Yellow 1, 2, 3, 12, 13, 14, 15, 16, 17, 55, 78, 150, 151, 154, 180, 185, and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C.I. Pigment Violet 196; C.I. Pigment Blue 1, 2, 3, 15, 15:1, 15:2, 15:3, 15:4, 16, 22, and 60; and C.I. Pigment Green 7 and 36. A commercially available product that is suitable as the pigment that is a raw material of the phosphate group-modified self-dispersing pigment may be, for example, carbon black such as "MA8" or "MA100" manufactured by Mitsubishi Chemical Corporation or "Color Black FW200" manufactured by Evonik Degussa GmbH. The modification by a phosphate group may be performed by treating these pigments by a conventional method.

The amount of solid content of the phosphate group-modified self-dispersing pigment to be added with respect to the total amount of the water-base ink (the amount of solid content of pigment in the water-based ink) is not particularly limited, and may be set suitably depending on a desired optical density or coloration, for example. The amount of solid content of pigment in the water-based ink is, for example, in the range of 0.1 wt % to 20 wt %, 1 wt % to 10 wt %, and 2 wt % to 8 wt %.

The water-based ink may further contain, as a coloring agent, other pigments and dyes besides the phosphate group-modified self-dispersing pigment.

The water used for the water-based ink may be ion-exchange water or purified water. The amount of the water to be added with respect to the total amount of the water-based ink (the proportion of the water in the water-based ink) is, for example, in the range of 10 wt % to 90 wt %, and 40 wt % to 80 wt %. The proportion of the water in the water-based ink may be a balance of the other components, for example.

Examples of the water-soluble organic solvent used for the water-based ink include: a humectant that prevents a water-based ink from drying at a nozzle tip portion of an ink jet head; and a penetrant that adjusts a drying rate of a water-based ink on a recording medium.

The humectant is not particularly limited, and examples thereof include lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketone such as acetone; keto alcohol such as diacetone alcohol; ethers such as tetrahydrofuran and dioxane; polyalcohols such as polyalkylene glycol, alkylene glycol, and glycerin; 2-pyrrolidone; N-methyl-2-pyrrolidone; and 1,3-dimethyl-2-imidazolidinone. Examples of the polyalkylene glycol include polyethylene glycol and polypropylene glycol. Examples of the alkylene glycol include ethylene glycol, propylene glycol, butylene glycol, diethylene glycol, triethylene glycol, dipropylene glycol, tripropylene glycol, thiodiglycol, and hexylene glycol. These humectants may be used alone or in a combination of two or more of them. Out of these, the humectant may be polyalcohol such as alkylene glycol or glycerin.

The amount of the humectant to be added with respect to the total amount of the water-based ink is, for example, in the range of 0 wt % to 95 wt %, 5 wt % to 80 wt %, and 5 wt % to 50 wt %.

Examples of the penetrant include glycol ethers. Examples of the glycol ethers include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. The penetrants may be used alone or in a combination of two or more of them.

The amount of the penetrant to be added with respect to the total amount of the water-based ink is, for example, in the range of 0 wt % to 20 wt %, 0.1 wt % to 15 wt %, and 0.5 wt % to 10 wt %.

The water-based ink may further contain a conventionally known additive as required. Examples of the additive include a surfactant, a pH adjuster, a viscosity modifier, a surface tension modifier, and a mildew proofing agent. Examples of the viscosity modifier include polyvinyl alcohol, cellulose, and a water-soluble resin.

The water-based ink may be prepared by uniformly mixing a phosphate group-modified self-dispersing pigment, water, a water-soluble organic solvent, and other components to be added as required by a conventionally known method, and then removing precipitates with a filter or the like, for example.

As mentioned above, the dynamic surface tension of the water-based ink, measured under the condition where a line time is 50 ms, is in the range of 35 mN/m to 45 mN/m. The dynamic surface tension of the water-based ink may be adjusted by changing the amounts of the components to be added of the water-based ink, for example.

Examples of the method for measuring the dynamic surface tension of the water-based ink include a maximum bubble pressure method, a vibrating-jet method, and a meniscus method. Out of these, the method may be the maximum bubble pressure method. The temperature at which the dynamic surface tension is measured is, for example, 25° C.

The measurement of the dynamic surface tension by the maximum bubble pressure method is performed as follows, for example. That is, gas is supplied from a gas supply source to a probe (a narrow tube), then the probe is immersed in the water-based ink, and bubbles are caused to generate from the tip of the probe. At that time, a change in pressure from the water-based ink against bubbles with a change in gas generation rate by changing a gas flow rate was measured, and the dynamic surface tension is determined by the following formula.

$$\sigma = (\Delta P \times r)/2$$

σ: dynamic surface tension
ΔP: difference between the maximum pressure against bubbles and the minimum pressure against the same.
r: radius of a probe tip portion The pressure against bubbles reaches maximum (the maximum bubble pressure) when a curvature radius of bubbles becomes the same as the radius of the probe tip portion.

The life time (a lifespan of bubbles) in the measurement of the dynamic surface tension is a time period from a time that bubbles are moved away from the probe after the bubble pressure reaches maximum to the time that a new interface is formed on the probe and the next bubble pressure reaches maximum.

The measurement of the dynamic surface tension by the maximum bubble pressure method may be performed using a dynamic surface tensiometer, "BP-D4" manufactured by KYOWA INTERFACE SCIENCE CO., LTD.

The treatment liquid comprises an aggregating agent, water, and a water-soluble organic solvent.

The aggregating agent has a function to cause a phosphate group-modified self-dispersing pigment in the water-based ink to aggregate when the water-based ink contacts with the treatment liquid on a recording medium. Examples of the aggregating agent include a polyvalent metal salt, a cationic polymer, and a cationic surfactant.

Examples of the polyvalent metal salt include aluminum chloride, aluminum bromide, aluminum sulfate, aluminum nitrate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, and zinc acetate. Out of these, the polyvalent metal salt may be a polyvalent metal salt of calcium or magnesium. Further, in the view of the degree of aggregation of a phosphate-group modified self-dispersing pigment, the polyvalent metal salt may be a divalent metal salt.

Examples of the cationic polymer include polyamine, polyallylamine, polyethylenimine, polyvinylamine, polyvinylpyridine, a polyethylenimine-epichlorohydrin reactant, a polyamide-polyamine resin, a polyamide-epichlorohydrin resin, cationic starch, polyvinyl alcohol, polyvinylpyrrolidone, polyamidine, a cationic epoxy resin, polyacrylamide, polyacrylic acid ester, polymethacrylic acid ester, polyvinylformamide, aminoacetalized polyvinyl alcohol, polyvinyl benzyl onium, a dicyandiamide-formalin polycondensation product, a dicyandiamide-diethylene triamine polycondensation product, epichlorohydrin-dimethylamine addition polymer, a dimethyl diallyl ammonium chloride-$SO_2$ copolymer, a dimethyl diallyl ammonium chloride polymer, and derivatives thereof. Examples of the cationic polymer include a polymer of single monomer composed of at least one of water-soluble monomers such as dimethylaminoethyl-methacrylate (DM), methacryloyloxyethyl-trimethylammonium-chloride (DMC), methacryloyloxyethyl-benzyldimethyl-ammonium chloride (DMBC), dimethylaminoethyl-acrylate (DA), acryloyloxyethyl-trimethylammonium-chloride (DMQ), acryloyloxyethyl-benzyldimethyl-ammonium chloride (DABC), dimethylaminopropyl-acrylamide (DMAPAA), and acrylamidopropyl-trimethylammonium-chloride (DMAPAAQ); and a copolymer of plural types of monomers.

Examples of the cationic surfactant include a primary amine salt compound, a secondary amine salt compound, a tertiary amine salt compound, an alkylamine salt, a dialkylamine salt, an aliphatic amine salt, a benzalkonium salt, a quaternary ammonium salt, a quaternary alkylammonium salt, an alkylpyridinium salt, an imidazolinium salt, a sulfonium salt, a phosphonium salt, and an onium salt. Examples of the cationic surfactant include hydrochloride salts of lauryl amine, coco amine, and rosin amine; acetate salts of the same; lauryl trimethyl aminium chloride; cetyl trimethyl ammonium chloride; benzyl tributyl aminium chloride; benzalkonium chloride; cetylpyridinium chloride; cetylpyridinium bromide; dihydroxyethyl laurylamine; decyl dimethyl benzyl ammonium chloride; dodecyl dimethyl benzyl ammonium chloride; tetradecyl dimethyl ammonium chloride; hexadecyl dimethyl ammonium chloride; and octadecyl dimethyl ammonium chloride. Out of these, the cationic surfactant may be dodecyl dimethyl ammonium chloride or tetradecyl dimethyl ammonium chloride.

The amount of the aggregating agent to be added with respect to the total amount of the treatment liquid is not particularly limited. For example, in the case where the aggregating agent is a polyvalent metal salt, the amount is, for example, in the range of 1 wt % to 30 wt %, and 5 wt % to 25 wt %. For example, in the case where the aggregating agent is a cationic polymer, the amount is, for example, in the range of 0.1 wt % to 15 wt %, and 1 wt % to 10 wt %. For example, in the case where the aggregating agent is a cationic surfactant, the amount is, for example, in the range of 1 wt % to 30 wt %, and 5 wt % to 25 wt %. The aggregating agents may be used alone or in a combination of two or more of them.

The water used for the treatment liquid may be ion-exchange water or purified water. The amount of water to be added with respect to the total amount of the treatment liquid may be a balance of the other components, for example.

As the water-soluble organic solvent used for the treatment liquid, a conventionally known water-soluble organic solvent may be used. Examples of the water-soluble organic solvent include polyvalent alcohol, a derivative thereof, alcohol, amide, ketone, keto alcohol, ether, a nitrogen-containing solvent, a sulfur-containing solvent, propylene carbonate, ethylene carbonate, and 1,3-dimethyl-2-imidazolidinone. Examples of the polyvalent alcohol include glycerin, ethylene glycol, triethylene glycol, polyethylene glycol, dipropylene glycol, tripropylene glycol, polypropylene glycol, trimethylolpropane, 1,5-pentanediol, and 1,2,6-hexanetriol. Examples of the derivative of the polyvalent alcohol include ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Examples of the alcohol include methyl alcohol, ethyl alcohol, n-propyl alcohol, isopropyl alcohol, n-butyl alcohol, sec-butyl alcohol, isobutyl alcohol, tert-butyl alcohol, and benzyl alcohol. Examples of the amide include dimethylformamide and dimethylacetamide. The ketone may be, for example, acetone. The keto alcohol may be, for example, diacetone alcohol. Examples of the ether include tetrahydrofuran and dioxane. Examples of the nitrogen-containing solvent include pyrrolidone, 2-pyrrolidone, N-methyl-2-pyrrolidone, cyclohexyl pyrrolidone, and triethanolamine Examples of the sulfur-containing solvent include thiodiethanol, thiodiglycol, thiodiglycerol, sulfolane, and dimethyl sulfoxide. The amount of the water-soluble organic solvent to be added with respect to the total amount of the treatment liquid is not particularly limited. These water-soluble organic solvents may be used alone or in a combination of two or more of them.

The treatment liquid may or may not contain a coloring agent. In the case where the treatment liquid contains a coloring agent, the amount of the coloring agent may be an amount by which a recorded image is not influenced.

The treatment liquid may further contain a conventionally known additive as required. Examples of the additive include a pH adjuster, a viscosity modifier, a surface tension modifier, an antioxidant, and a mildew proofing agent. Examples of the viscosity modifier include polyvinyl alcohol, cellulose, and a water-soluble resin.

The treatment liquid may be prepared by uniformly mixing an aggregating agent, water, a water-soluble organic solvent, and other components to be added as required by a conventionally known method.

As mentioned above, the dynamic surface tension of the treatment liquid, measured under the condition where a life time is 50 ms, is in the range of 33 mN/m to 45 mN/m. The dynamic surface tension of the treatment liquid can be adjusted by changing the amounts of the components to be added of the treatment liquid, for example. The dynamic surface tension of the treatment liquid can be measured in the same manner as the water-based ink.

By adjusting the dynamic surface tensions of the water-based ink and the treatment liquid to be in the respective predetermined ranges, the ink set is superior in suppression of ooze in a recorded image (for example, sharp edge and bleeding).

The ink set may be provided as an ink cartridge. For example, the ink cartridge includes an ink storing portion and a treatment liquid storing portion. The ink storing portion stores the above-mentioned water-based ink, and the treatment liquid storing portion stores the above-mentioned treatment liquid. The ink cartridge may further include a portion for storing a water-based ink other than the above-mentioned water-based ink.

The ink cartridge may be an ink cartridge assembly obtained by assembling a water-based ink cartridge and a treatment liquid cartridge which are formed individually, or may be an integrated ink cartridge obtained by integrating the ink storing portion and the treatment liquid storing portion.

Next, the ink jet recording method is described. As mentioned above, the ink jet recording method comprises: a treatment step of applying a treatment liquid to a recording medium; and a recording step of performing recording by ejecting a water-based ink on the recording medium using an ink-jet system. As the water-based ink, the water-based ink in the above-mentioned ink set is used, and as the treatment liquid, the treatment liquid in the above-mentioned ink set is used. The recording includes recording of letters; images; printing; and the like. In the treatment step, the treatment liquid may be applied by, for example, an ink-jet system or a method of stamp coating, brush coating, or roller coating.

The ink jet recording method may be performed using an ink jet head-mounted ink jet recording apparatus having a configuration in which a treatment liquid in the ink set is ejected from the ink jet head.

As shown in FIG. 1, an ink jet recording apparatus 1 includes, as main components, an ink cartridge assembly 2, an ink-jet head 3, a head unit 4, a carriage 5, a drive unit 6, a platen roller 7, and a purge unit 8.

The ink cartridge assembly 2 includes a treatment liquid cartridge 2a and four water-based ink cartridges 2b. The treatment liquid cartridge 2a contains a treatment liquid in the above-mentioned ink set. The four water-based ink cartridges 2b contain water-based inks of four colors, namely, yellow, magenta, cyan, and black, respectively. At least one of the four water-based inks is a water-based ink in the above-mentioned ink set.

The head unit 4 is provided with the ink-jet head 3. The ink cartridge assembly 2 and the head unit 4 are mounted on the carriage 5. The drive unit 6 reciprocates the carriage 5 in a straight line. As the drive unit 6, a conventionally known drive unit may be used, for example (see JP 2008-246821 A, for example). The platen roller 7 extends in the reciprocating direction of the carriage 5 and is arranged so as to face to the ink-jet head 3.

The recording medium (for example, recording paper) P is fed from a paper feeding cassette (not shown) positioned on the side of or below the ink jet recording apparatus 1. The recording medium P is introduced between the ink jet head 3 and the platen roller 7. Then, the treatment liquid is applied to (ejected on) the introduced recording medium P from the ink-jet head 3.

Figure 2A:
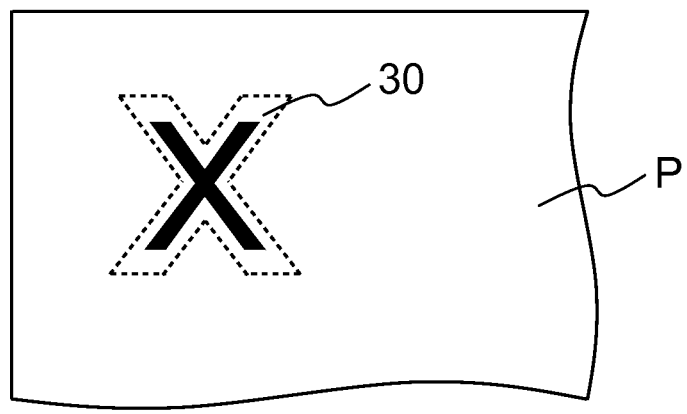
FIGS. 2A and 2B are illustrations showing examples of recording by the ink-jet recording method, respectively.
Figure 2B:
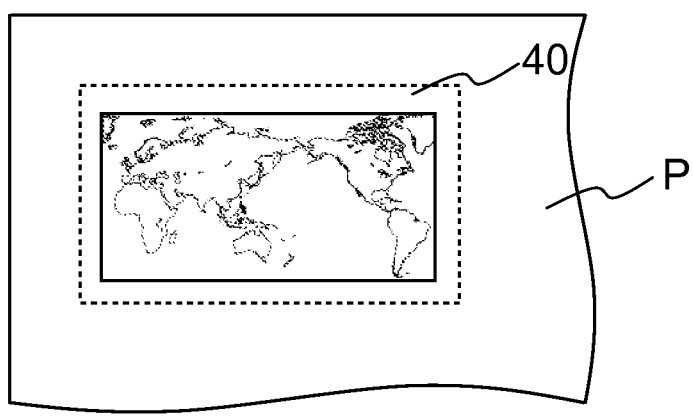

The treatment liquid may be applied to the whole or a part of a record surface of the recording medium. When the treatment liquid is applied to a part of a record surface of the recording medium, at least a part recorded with a water-based ink in a record surface of the recording medium is a part to which the treatment liquid is applied. When the treatment liquid is applied to a part of a record surface of the recording medium, the part to which the treatment liquid is applied may be bigger than the part recorded with a water-based ink. For example, as shown in FIG. 2A, when a character (X) is recorded on a recording medium P, the treatment liquid may be applied so that the part 30 to which the treatment liquid is applied is formed with a line having a wider line width than the character. Further, as shown in FIG. 2B, when a pattern is recorded on a recording medium P, the treatment liquid may be applied so that the part 40 to which the treatment liquid is applied is bigger than the pattern.

Next, the water-based ink is ejected from the ink-jet head 3 on the treatment liquid that has been applied on the recoding medium P. The time period between the ejection of the treatment liquid and that of the water-based ink is not particularly limited, and the ejection of the water-based ink may be performed in the same operation as the ejection of the treatment liquid.

The water-based ink may be ejected after the ejection of the treatment liquid as in the present example. Accordingly, for example, efficiency of aggregating a phosphate group-modified self-dispersing pigment in the water-based ink may be increased. Note here that the treatment liquid may be applied to a recording medium after the ejection of the water-based ink.

The recorded recording paper P then is discharged from the ink-jet recording apparatus 1. In FIG. 1, a feeding mechanism and a discharging mechanism of the recording medium P are not shown.

The purge unit 8 draws poor inks containing air bubbles and the like trapped inside the ink jet head 3. As the purge unit 8, a conventionally known purge unit may be used, for example (see JP 2008-246821 A, for example).

On the platen roller 7 side of the purge unit 8, a wiper member 20 is provided adjacent to the purge unit 8. The wiper member 20 has a spatula shape, and wipes a nozzle-formed surface of the ink-jet head 3 accompanying the movement of the carriage 5. In FIG. 1, in order to prevent the treatment liquid and the water-based ink from drying, a cap 18 covers a plurality of nozzles of the ink jet head 3, which returns to the reset position after completion of the recording.

In the ink jet recording apparatus 1 of the present example, the ink cartridge assembly 2 is mounted on one carriage 5 together with the head unit 4. In the ink jet recording apparatus, the respective cartridges of the ink cartridge assembly 2 may be mounted on a carriage that is different from a cartridge on which the head unit 4 is mounted. Alternatively, the respective cartridges of the ink cartridge assembly 2 may not be mounted on the carriage 5, but may be arranged and fixed in the ink-jet recording apparatus. In such embodiment, for example, the respective cartridges of the ink cartridge assembly 2 are connected to the head unit 4 mounted on the carriage 5 via a tube or the like, and the treatment liquid and water-based inks are supplied to the head unit 4 from the respective cartridges of the ink cartridge assembly 2.

In the apparatus shown in FIG. 1, a serial-type ink jet head is employed, but the ink jet recording apparatus may be an apparatus in which a line-type ink jet head is employed.

EXAMPLES

Next, the examples are described together with the comparative examples. Note here that the present invention is not limited by the following examples and comparative examples.

(Preparation of Water-Based Ink)

Components except an aqueous dispersion of self-dispersing pigment in water-based ink composition (Table 1) were mixed uniformly, so that each ink solvent was obtained. Then the ink solvent was added to the aqueous dispersion of a self-dispersing pigment, and they were mixed uniformly. Thereafter a mixture thus obtained was filtered with a cellulose acetate membrane filter (with a pore size of 3.00 μm) manufactured by Toyo Roshi Kaisha, Ltd. Thus, the water-based inks for ink jet recording A to K were obtained.

(Preparation of Treatment Liquid)

Components in treatment liquid composition (Table 2) were mixed uniformly, so that treatment liquids A to E were obtained.

TABLE 1

| | Water-based ink | | | | | | | | | | |
|---|---|---|---|---|---|---|---|---|---|---|---|
| | A | B | C | D | E | F | G | H | I | J | K |
| Aqueous dispersion of phosphate group-modified self-dispersing pigment (*1) | 4.0 | 4.0 | 4.0 | 4.0 | 4.0 | — | — | — | — | — | — |
| Aqueous dispersion of carboxylic group-modified self-dispersing pigment (*2) | — | — | — | — | — | 4.0 | — | 4.0 | — | 4.0 | — |
| Aqueous dispersion of sulfonate group-modified self-dispersing pigment (*3) | — | — | — | — | — | — | 4.0 | — | 4.0 | — | 4.0 |
| Glycerin | 28.1 | 28.1 | 28.1 | 28.1 | 28.1 | 28.1 | 28.1 | 28.1 | 28.1 | 28.1 | 28.1 |
| Dipropylene glycol-n-propyl ether | 1.0 | 1.0 | 1.0 | 1.0 | — | 1.0 | 1.0 | 1.0 | 1.0 | 1.0 | 1.0 |
| SUNNOL ® NL1430 (*4) | — | 0.2 | 0.2 | 0.2 | 0.2 | 0.2 | 0.2 | 0.2 | 0.2 | 0.2 | 0.2 |
| OLFINE ® E1010 (*5) | — | 0.25 | 0.15 | 0.05 | — | 0.15 | 0.15 | 0.25 | 0.25 | 0.05 | 0.05 |
| SH 3746 (*6) | 2.0 | — | — | — | — | — | — | — | — | — | — |
| Water | Balance | Balance | Balance | Balance | Balance | Balance | Balance | Balance | Balance | Balance | Balance |
| Dynamic surface tension (mN/m) | 28 | 35 | 39 | 45 | 71 | 39 | 39 | 35 | 35 | 45 | 45 |

(*1): The aqueous dispersion was prepared by the method described in JP 2009-515007 A, a number in table represents a solid content of pigment.
(*2): The aqueous dispersion was prepared by the method described in JP 2008-524400 A, a number in table represents a solid content of pigment.
(*3): The aqueous dispersion was prepared by the method described in JP 2008-524400 A, a number in table represents a solid content of pigment.
(*4): Sodium polyoxyethylene alkyl (C = 12, 13) ether sulfate (3E.O.), manufactured by Lion Corporation
(*5): Ethylene oxide (10 mol) adduct of acethylene diol, manufactured by Nissin Chemical Co., Ltd.
(*6): Silicone surfactant, manufactured by Dow Corning Toray Co., Ltd.
Unit of amount to be added: wt %

TABLE 2

| | Treatment liquid | | | | |
|---|---|---|---|---|---|
| | A | B | C | D | E |
| Calcium nitrate tetrahydrate | 21.0 | 21.0 | 21.0 | 21.0 | 21.0 |
| Glycerin | 21.3 | 20.0 | 21.3 | 21.3 | 21.3 |
| Dipropylene glycol-n-propyl ether | 1.0 | — | — | — | — |
| Triethylene glycol | 20.0 | 21.0 | 21.0 | 21.0 | 21.0 |
| OLFINE ® E1010 (*5) | — | 2.0 | 1.0 | 0.2 | — |
| SH3746 (*6) | 1.0 | — | — | — | — |
| Water | Balance | Balance | Balance | Balance | Balance |
| Dynamic surface tension (mN/m) | 27 | 33 | 35 | 45 | 67 |

(*5): Ethylene oxide (10 mol) adduct of acethylene diol, manufactured by Nissin Chemical Co., Ltd.
(*6): Silicone surfactant, manufactured by Dow Corning Toray Co., Ltd.
Unit of amount to be added: wt %

Examples 1 to 7 and Comparative Examples 1 to 18

Ink sets were obtained by combining the water-based inks and the treatment liquids as summarized in Tables 3 to 6.

In the examples and the comparative examples, (a) sharp edge evaluation, (b) bleeding evaluation, and (c) optical density (OD value) evaluation were conducted by the following methods.

(a) Sharp Edge Evaluation

Each of the treatment liquids in the respective ink sets of the examples and the comparative examples was spread evenly on plain papers using a bar coater (with a Rod No. 8, manufactured by YASUDA SEIKI SEISAKUSHO, LTD.). As the plain papers, My paper (plain paper 1) manufactured by Ricoh Company, Ltd. and BP60PA (plain paper 2) manufactured by Brother Industries, Ltd. were used.

A ruled line of black with a thickness of 0.75 point was recorded on the plain papers with each of the water-based inks in the respective ink sets of the examples and the comparative examples using Excel manufactured by Microsoft Corporation and a digital multi-function center DCP-385C which on an ink jetprinter mounted, manufactured by Brother Industries, Ltd. at a resolution of 600 dpi×600 dpi. Thus, evaluation samples were produced. The sharp edge of each of the evaluation samples was measured by Handheld Image Analysis System, "PIAS®-II" manufactured by Quality Engineering Associates, Inc. and evaluated according to the following evaluation criteria. The measurement of the raggedness was conducted three times with respect to each plain paper in conformance with ISO-13660. The measurement result of each of the plain papers is obtained by rounding the average value of the results of the three-time measurements to the whole number. "Average of two plain papers" means a value obtained by rounding the average value of the measurement results of the two plain papers, which is obtained by dividing the sum of average values (before being rounded to the whole number) of the respective plain papers 1 and 2 by 2, to the whole number.

Evaluation Criteria for Sharp Edge Evaluation

G: The average value of raggedness of two papers was 12 μm or less.

NG: The average value of raggedness of two papers was greater than 12 μm.

(b) Bleeding Evaluation

In the same manner as the sharp edge evaluation, each of the treatment liquids in the respective ink sets of the examples and the comparative examples was spread evenly on plain papers.

Next, between the yellow regions formed on the plain papers using a water-based yellow ink for ink jet recording (LC11Y, manufactured by Brother Industries, Ltd.), which is for the ink-digital multi-function center DCP-385C, a patch of black line is recorded with each of the water-based inks in the respective ink sets of the examples and the comparative examples using the digital multi-function center DCP-385C. Thus, evaluation samples were produced. The bleeding of each of the evaluation samples was measured by the Handheld Image Analysis System, "PIAS®-II" and evaluated according to the following evaluation criteria. The measurement of the raggedness was conducted three times with respect to each plain paper in conformance with ISO-13660. The measurement result of each of the plain papers is obtained by rounding the average value of the results of the three-time measurements to the whole number. "Average of two plain papers" means a value obtained by rounding the average value of the measurement results of the two plain papers, which is obtained by dividing the sum of average values (before being rounded to the whole number) of the respective plain papers 1 and 2 by 2, to the whole number.

Evaluation Criteria for Bleeding Evaluation

G: The average value of raggedness of two papers was 14 µm or less.

NG: The average value of raggedness of two papers was greater than 14 µm.

(c) Optical Density (OD Value) Evaluation

In the same manner as the sharp edge evaluation, each of the treatment liquids in the respective ink sets of the examples and the comparative examples was spread evenly on plain papers.

A single patch of black was recorded on the plain papers with each of the water-based inks in the respective ink sets of the examples and the comparative examples using the digital multi-function center DCP-385C at a resolution of 600 dpi×600 dpi. Thus, evaluation samples were produced. Optical densities (OD values) of each of the evaluation samples were measured by a spectrocolorimeter, Spectrolino manufactured by GretagMacbeth (light source: $D_{50}$, viewing angle: 2°, Filter: Status T) and evaluated according to the following evaluation criteria. The measurement of the optical density (the OD value) was conducted three times with respect to each plain paper. The measurement result of each of the plain papers is obtained by rounding the average value of the results of the three-time measurements to the second decimal place. "Average of two plain papers" means a value obtained by rounding the average value of the measurement results of the two plain papers, which is obtained by dividing the sum of average values (before being rounded to the second decimal place) of the respective plain papers 1 and 2 by 2, to the second decimal place.

Evaluation Criteria for Optical Density (OD Value) Evaluation

G: The average value of optical densities of two papers was 1.45 or more.

NG: The average value of optical densities of two papers was less than 1.45.

The water-based inks and the treatment liquids in the respective ink sets of Examples 1 to 7 and Comparative Examples 1 to 18, dynamic surface tensions thereof, and evaluation results thereof are summarized in Tables 3 to 6. In Tables 3 to 6, dynamic surface tensions of the water-based inks A to K and the treatment liquids A to E were measured by a maximum bubble pressure method using a dynamic surface tensiometer, "BP-D4" manufactured by Kyowa Interface Science Co., Ltd. at 25° C. under the condition where the life time is 50 ms. The dynamic surface tensions of the water-based inks A to K are also summarized in Tables 1 and 2.

TABLE 3

|  |  | Example 1 | Example 2 | Example 3 | Example 4 | Example 5 | Example 6 | Example 7 |
|---|---|---|---|---|---|---|---|---|
|  | Water-based ink | Water-based ink B | Water-based ink B | Water-based ink B | Water-based ink C | Water-based ink D | Water-based ink D | Water-based ink D |
|  | Modifying group of self-dispersing pigment | Phosphate group | Phosphate group | Phosphate group | Phosphate group | Phosphate group | Phosphate group | Phosphate group |
|  | Dynamic surface tension (mN/m) | 35 | 35 | 35 | 39 | 45 | 45 | 45 |
|  | Treatment liquid | Treatment liquid B | Treatment liquid C | Treatment liquid D | Treatment liquid C | Treatment liquid B | Treatment liquid C | Treatment liquid D |
|  | Dynamic surface tension (mN/m) | 33 | 35 | 45 | 35 | 33 | 35 | 45 |
| Sharp edge | Plain paper 1 (µm) (*7) | 11 | 12 | 12 | 13 | 12 | 12 | 10 |
|  | Plain paper 2 (µm) (*8) | 10 | 11 | 10 | 12 | 10 | 11 | 11 |
|  | Average of two plain papers (µm) | 11 | 12 | 11 | 12 | 11 | 11 | 11 |
|  | Evaluation | G | G | G | G | G | G | G |
| Bleeding | Plain paper 1 (µm) (*7) | 13 | 14 | 14 | 14 | 12 | 12 | 11 |
|  | Plain paper 2 (µm) (*8) | 13 | 13 | 13 | 14 | 11 | 13 | 13 |
|  | Average of two plain papers (µm) | 13 | 13 | 13 | 14 | 12 | 12 | 12 |
|  | Evaluation | G | G | G | G | G | G | G |
| Optical density (OD value) | Plain paper 1 (*7) | 1.43 | 1.44 | 1.52 | 1.44 | 1.47 | 1.45 | 1.51 |
|  | Plain paper 2 (*8) | 1.46 | 1.48 | 1.45 | 1.53 | 1.48 | 1.48 | 1.46 |
|  | Average of two plain papers | 1.45 | 1.46 | 1.49 | 1.49 | 1.48 | 1.47 | 1.49 |
|  | Evaluation | G | G | G | G | G | G | G |

(*7): My paper, manufactured by Ricoh Company, Ltd.
(*8): BP60PA, manufactured by Brother Industries, Ltd.

TABLE 4

|  | Comp. Ex. 1 | Comp. Ex. 2 | Com. Ex. 3 | Comp. Ex. 4 | Comp. Ex. 5 |
|---|---|---|---|---|---|
| Water-based ink | Water-based ink H | Water-based ink H | Water-based ink F | Water-based ink J | Water-based ink J |
| Modifying group of | Carboxylic group | Carboxylic group | Carboxylic group | Carboxylic group | Carboxylic group |

TABLE 4-continued

|  |  | Comp. Ex. 1 | Comp. Ex. 2 | Com. Ex. 3 | Comp. Ex. 4 | Comp. Ex. 5 |
|---|---|---|---|---|---|---|
|  | self-dispersing pigment |  |  |  |  |  |
|  | Dynamic surface tension (mN/m) | 35 | 35 | 39 | 45 | 45 |
|  | Treatment liquid | Treatment liquid B | Treatment liquid D | Treatment liquid C | Treatment liquid B | Treatment liquid D |
|  | Dynamic surface tension (mN/m) | 33 | 45 | 35 | 33 | 45 |
| Sharp edge | Plain paper 1 (μm) (*7) | 15 | 18 | 15 | 13 | 21 |
|  | Plain paper 2 (μm) (*8) | 17 | 17 | 15 | 15 | 14 |
|  | Average of two plain papers (μm) | 16 | 17 | 15 | 14 | 17 |
|  | Evaluation | NG | NG | NG | NG | NG |
| Bleeding | Plain paper 1 (μm) (*7) | 16 | 18 | 16 | 15 | 17 |
|  | Plain paper 2 (μm) (*8) | 16 | 13 | 15 | 14 | 17 |
|  | Average of two plain papers (μm) | 16 | 15 | 15 | 14 | 17 |
|  | Evaluation | NG | NG | NG | G | NG |
| Optical density (OD value) | Plain paper 1 (*7) | 1.19 | 1.22 | 1.23 | 1.20 | 1.31 |
|  | Plain paper 2 (*8) | 1.37 | 1.32 | 1.37 | 1.38 | 1.35 |
|  | Average of two plain papers | 1.28 | 1.27 | 1.30 | 1.29 | 1.33 |
|  | Evaluation | NG | NG | NG | NG | NG |

(*7): My paper, manufactured by Ricoh Company, Ltd.
(*8): BP60PA, manufactured by Brother Industries, Ltd.

TABLE 5

|  |  | Comp. Ex. 6 | Comp. Ex. 7 | Comp. Ex. 8 | Comp. Ex. 9 | Comp. Ex. 10 |
|---|---|---|---|---|---|---|
|  | Water-based ink | Water-based ink I | Water-based ink I | Water-based ink G | Water-based ink K | Water-based ink K |
|  | Modifying group of self-dispersing pigment | Sulfonate group | Sulfonate group | Sulfonate group | Carboxylic group | Carboxylic group |
|  | Dynamic surface tension (mN/m) | 35 | 35 | 39 | 45 | 45 |
|  | Treatment liquid | Treatment liquid B | Treatment liquid D | Treatment liquid C | Treatment liquid B | Treatment liquid D |
|  | Dynamic surface tension (mN/m) | 33 | 45 | 35 | 33 | 45 |
| Sharp edge | Plain paper 1 (μm) (*7) | 14 | 21 | 17 | 17 | 29 |
|  | Plain paper 2 (μm) (*8) | 15 | 11 | 14 | 14 | 13 |
|  | Average of two plain papers (μm) | 14 | 16 | 16 | 16 | 21 |
|  | Evaluation | NG | NG | NG | NG | NG |
| Bleeding | Plain paper 1 (μm) (*7) | 17 | 18 | 16 | 16 | 20 |
|  | Plain paper 2 (μm) (*8) | 14 | 12 | 15 | 13 | 13 |
|  | Average of two plain papers (μm) | 15 | 15 | 15 | 15 | 16 |
|  | Evaluation | NG | NG | NG | NG | NG |
| Optical density (OD value) | Plain paper 1 (*7) | 1.06 | 1.02 | 1.05 | 1.05 | 1.09 |
|  | Plain paper 2 (*8) | 1.37 | 1.34 | 1.35 | 1.36 | 1.33 |
|  | Average of two plain papers | 1.22 | 1.18 | 1.20 | 1.21 | 1.21 |
|  | Evaluation | NG | NG | NG | NG | NG |

(*7): My paper, manufactured by Ricoh Company, Ltd.
(*8): BP60PA, manufactured by Brother Industries, Ltd.

TABLE 6

|  | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 |
|---|---|---|---|---|---|---|---|---|
| Water-based ink | Water-based ink A | Water-based ink A | Water-based ink A | Water-based ink C | Water-based ink C | Water-based ink E | Water-based ink E | Water-based ink E |
| Modifying group | Phosphate | Phosphate | Phosphate | Phosphate | Phosphate | Phosphate | Phosphate | Phosphate |

TABLE 6-continued

|  |  | Comp. Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 |
|---|---|---|---|---|---|---|---|---|---|
|  | of self-dispersing pigment | group | group | group | group | group | group | group | group |
|  | Dynamic surface tension (mN/m) | 28 | 28 | 28 | 39 | 39 | 71 | 71 | 71 |
|  | Treatment liquid | Treatment liquid A | Treatment liquid C | Treatment liquid E | Treatment liquid A | Treatment liquid E | Treatment liquid A | Treatment liquid C | Treatment liquid E |
|  | Dynamic surface tension (mN/m) | 27 | 35 | 67 | 27 | 67 | 27 | 35 | 67 |
| Sharp edge | Plain paper 1 (μm) (*7) | 11 | 13 | 14 | 11 | 19 | 14 | 10 | 12 |
|  | Plain paper 2 (μm) (*8) | 12 | 13 | 12 | 12 | 10 | 12 | 10 | 12 |
|  | Average of two plain papers (μm) | 11 | 13 | 13 | 11 | 14 | 13 | 10 | 12 |
|  | Evaluation | G | NG | NG | G | NG | NG | G | G |
| Bleeding | Plain paper 1 (μm) (*7) | 13 | 17 | 17 | 11 | 11 | 15 | 11 | 14 |
|  | Plain paper 2 (μm) (*8) | 12 | 15 | 14 | 15 | 15 | 13 | 13 | 13 |
|  | Average of two plain papers (μm) | 13 | 16 | 15 | 13 | 13 | 14 | 12 | 13 |
|  | Evaluation | G | NG | NG | G | G | G | G | G |
| Optical density (OD value) | Plain paper 1 (*7) | 1.42 | 1.48 | 1.50 | 1.37 | 1.60 | 1.28 | 1.33 | 1.57 |
|  | Plain paper 2 (*8) | 1.43 | 1.47 | 1.47 | 1.39 | 1.42 | 1.30 | 1.39 | 1.17 |
|  | Average of two plain papers | 1.43 | 1.48 | 1.49 | 1.38 | 1.51 | 1.29 | 1.36 | 1.37 |
|  | Evaluation | NG | G | G | NG | G | NG | NG | NG |

(*7): My paper, manufactured by Ricoh Company, Ltd.
(*8): BP60PA, manufactured by Brother Industries, Ltd.

As summarized in Table 3, all of the evaluation results in the sharp edge evaluation, the bleeding evaluation, and the optical density (OD value) evaluation were favorable in Examples 1 to 7. In contrast, as summarized in Tables 4 and 5, in Comparative Examples 1 to 5 in each of which the water-based ink containing a carboxylic group-modified self-dispersing pigment is used and Comparative Examples 6 to 10 in each of which the water-based ink containing a sulfonate group-modified self-dispersing pigment is used, at least one of the evaluation results in the sharp edge evaluation, the bleeding evaluation, and the optical density (OD value) evaluation was unfavorable even though the dynamic surface tensions of the water-based inks and the treatment liquids were in the respective ranges of the present invention. As summarized in Table 6, in Comparative Examples 11 to 18 in each of which at least one of the dynamic surface tensions of the water-based ink and the treatment liquid was out of the range of the present invention, at least one of the evaluation results in the optical density (OD value) evaluation, the sharp edge evaluation, and the bleeding evaluation was unfavorable even though the water-based ink containing a phosphate-group modified self-dispersing pigment was used.

It will be obvious to those having skill in the art that many changes may be made in the above-described details of the particular aspects described herein without departing from the spirit or scope of the invention as defined in the appended claims.

What is claimed is:

1. An ink set comprising:
    a water-based ink for ink jet recording; and
    a treatment liquid, wherein
    the water-based ink comprises a phosphate-group modified self-dispersing pigment, water, and a water-soluble organic solvent,
    the treatment liquid comprises an aggregating agent, water, and a water-soluble organic solvent,
    a dynamic surface tension of the water-based ink, measured under a condition where a life time is 50 ms, is in a range of 35 mN/m to 45 mN/m,
    a dynamic surface tension of the treatment liquid, measured under a condition where a life time is 50 ms, is in a range of 33 mN/m to 45 mN/m, and
    a difference in dynamic surface tension between the water-based ink and the treatment liquid is in a range of 0 to 12 mN/m.

2. The ink set according to claim 1, wherein the phosphate-group modified self-dispersing pigment is a self-dispersing carbon black.

3. The ink set according to claim 1, wherein the aggregating agent comprises calcium nitrate tetrahydrate.

4. The ink set according to claim 1, wherein the water-based ink comprises dipropylene glycol-n-propyl ether and a surfactant.

5. An ink jet recording method, comprising:
    a treatment step of applying a treatment liquid to a recording medium, and
    a recording step of performing recording by ejecting a water-based ink on the recording medium using an ink-jet system, wherein
    as the water-based ink, the water-based ink in the ink set according to claim 1 is used, and
    as the treatment liquid, the treatment liquid in the ink set according to claim 1 is used.

6. The ink-jet recording method according to claim 5, wherein
    the treatment step is performed prior to the recording step, and
    the recording with the water-based ink is performed on a part of the recording medium to which the treatment liquid is applied.

* * * * *